United States Patent
Strobel et al.

(10) Patent No.: US 10,260,620 B2
(45) Date of Patent: Apr. 16, 2019

(54) METHOD FOR THE RUNNING IN OF A WORM-WHEEL GEAR

(71) Applicants: ThyssenKrupp Presta AG, Eschen (LI); ThyssenKrupp AG, Essen (DE)

(72) Inventors: Joseph-Léon Strobel, Mauren (LI); Paul Schwarzhans, Feldkirch (AT)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 337 days.

(21) Appl. No.: 15/102,419

(22) PCT Filed: Dec. 11, 2014

(86) PCT No.: PCT/EP2014/003326
§ 371 (c)(1),
(2) Date: Jun. 7, 2016

(87) PCT Pub. No.: WO2015/086156
PCT Pub. Date: Jun. 18, 2015

(65) Prior Publication Data
US 2016/0341304 A1    Nov. 24, 2016

(30) Foreign Application Priority Data

Dec. 13, 2013   (DE) ........................ 10 2013 020 599

(51) Int. Cl.
*F16H 57/12*     (2006.01)
*F16H 57/00*     (2012.01)
(Continued)

(52) U.S. Cl.
CPC .............. *F16H 57/12* (2013.01); *B62D 5/04* (2013.01); *B62D 5/0409* (2013.01); *F16H 1/16* (2013.01);
(Continued)

(58) Field of Classification Search
CPC .......... F16H 57/12; F16H 1/16; F16H 57/002; F16H 57/0498; F16H 57/00;
(Continued)

(56) References Cited

U.S. PATENT DOCUMENTS 3,664,886 A * 5/1972 Pedersen ................. B23F 19/04
148/262
5,057,057 A * 10/1991 Riemscheid .............. F16H 3/06
474/69
(Continued)

FOREIGN PATENT DOCUMENTS

CN       101307817 A    11/2008
DE   198 24 382 A1    12/1999
(Continued)

OTHER PUBLICATIONS

English language machine translation of DE 10 2010 003 727 A1.
International Search Report for PCT/EP2014/003326 dated Feb. 13, 2015 (dated Feb. 23, 2015).

*Primary Examiner* — Jacob J Cigna
(74) *Attorney, Agent, or Firm* — thyssenkrupp North America, Inc.

(57) ABSTRACT

One method for running in a worm gear of an electromechanical steering system may comprise preparing the electromechanical servo steering system in a preassembled state in which one end of a worm shaft close to a motor or an end remote from the motor is mounted rotatably in a bearing in the gear housing and the respective other end of the worm shaft is movable in a radial direction so as to form a free end; rotatably mounting the free end of the worm shaft in an adjustable pretensioning device that is configured to pretension the worm shaft in a direction of the worm wheel in the engagement; adjusting the pretensioning device by way of a control device for generating a defined pretensioning of the engagement; and driving the worm shaft as a function of the control device at a defined rotational speed for a determined period of time.

8 Claims, 1 Drawing Sheet

(51) Int. Cl.
  *B62D 5/04* (2006.01)
  *F16H 1/16* (2006.01)
  *F16H 57/022* (2012.01)
  *F16H 57/04* (2010.01)
  *F16H 57/021* (2012.01)

(52) U.S. Cl.
  CPC ........... *F16H 57/00* (2013.01); *F16H 57/022* (2013.01); *F16H 57/0498* (2013.01); *F16H 2057/0213* (2013.01); *F16H 2057/0222* (2013.01); *F16H 2057/0225* (2013.01); *F16H 2057/126* (2013.01)

(58) Field of Classification Search
  CPC ....... F16H 2057/126; F16H 2057/0222; F16H 2057/0225; F16H 2057/0213; B26D 5/04
  See application file for complete search history.

(56) References Cited

U.S. PATENT DOCUMENTS

| | | | |
|---|---|---|---|
| 6,272,942 B1 | 8/2001 | Ganser | |
| 6,708,796 B2* | 3/2004 | Kinme | B62D 5/0409 180/444 |
| 8,646,351 B2* | 2/2014 | Fuechsel | B62D 5/0409 74/388 PS |
| 8,695,751 B2* | 4/2014 | Wilkes | B62D 5/0409 180/444 |
| 2002/0017420 A1 | 2/2002 | Kinme et al. | |
| 2006/0196295 A1* | 9/2006 | Maeda | B23F 11/00 74/425 |
| 2008/0282822 A1 | 11/2008 | Birker | |
| 2011/0155499 A1* | 6/2011 | Wilkes | B62D 5/0409 180/444 |
| 2013/0008298 A1* | 1/2013 | Adams | G10D 3/143 84/304 |
| 2013/0206497 A1 | 8/2013 | Fuechsel et al. | |
| 2014/0000401 A1* | 1/2014 | Kunishima | B62D 5/00 74/421 R |

FOREIGN PATENT DOCUMENTS

| | | | |
|---|---|---|---|
| DE | 101 23 767 A1 | 11/2001 | |
| DE | 602 10 154 T2 | 3/2007 | |
| DE | 202 21 954 U1 | 8/2009 | |
| DE | 10 2010 002 285 A1 | 8/2011 | |
| DE | 10 2010 003 727 A1 | 10/2011 | |
| EP | 1225116 A2 | 7/2002 | |
| EP | 2 423 075 A2 | 2/2012 | |
| JP | 2011127722 A * | 6/2011 | ......... F16H 57/0431 |

* cited by examiner

METHOD FOR THE RUNNING IN OF A WORM-WHEEL GEAR

CROSS REFERENCE TO RELATED APPLICATIONS

This application is a U.S. National Stage Entry of International Patent Application Serial Number PCT/EP2014/003326, filed Dec. 11, 2014, which claims priority to German Patent Application No. DE 102013020599.9 filed Dec. 13, 2013, the entire contents of both of which are incorporated herein by reference.

FIELD

The present disclosure relates to worm wheel gears for electromechanical steering systems.

BACKGROUND

An electromechanical steering system may have an electric servomotor that drives a worm shaft that meshes with a worm wheel arranged on an input shaft of a steering gear, wherein the worm wheel is operatively connected to an input shaft of the steering gear, and wherein the worm shaft and the input shaft are mounted rotatably in a gear housing. The worm shaft and the input shaft may be mounted here in a single, common housing, but also in a multipart gear housing or even in a plurality of gear housings.

A servo steering system of this type imposes relatively high demands on the exactness of the components. In particular, the toothing engagement of the worm wheel and of the worm shaft has to be as precise as possible in order to ensure good transmission of force and torque with little production of noise. Furthermore, constantly changing rotational movements should be anticipated in steering systems, which rotational movements have to be correspondingly transmitted without play by a gear of this type.

A multiplicity of such gears are known, for example from DE 10 2010 003 727 A1, DE 10 2010 002 285 A1 and EP 2 423 075 A2. In general, a multiplicity of these power steering boosts contain means for compensating for the axial or radial play of the toothing engagement by means of springs, wherein it can also be provided, as disclosed in DE 10 2010 002 285 A1, to eliminate a large portion of the play or a basic play by means of a readjustment device and to compensate for remaining residual plays or alternating loadings by corresponding cushioning.

It is known from laid-open application DE 198 24 382 A1 to adjust a fundamental play in a previously described gear once during the installation and then to set same.

The abovementioned measures for adjusting the play between the tooth flanks in the geared engagement require a high technical outlay in order to optimally configure the toothing engagements and to optimally match the toothings to one another. For this purpose, very exacting tolerances have to be maintained, which lead to high costs.

DE 10 2010 002 285 A1 furthermore discloses the possibility of using a plastics toothed ring for the worm wheel. Plastics toothings of this type are used in order to damp impact noises and to introduce a certain degree of elasticity into the system so that possibly present tolerance fluctuations can be compensated for. In the case of electric servo steering systems, the forces which act on the tooth flanks are, however, of such a high magnitude that a correspondingly high degree of wear of the plastics toothing has to be taken into account if the damping properties are actually intended to be used. Alternatively, use can be made of solid plastics in which, however, the desired dampings do not occur during operation.

DETAILED DESCRIPTION

Figure 1:
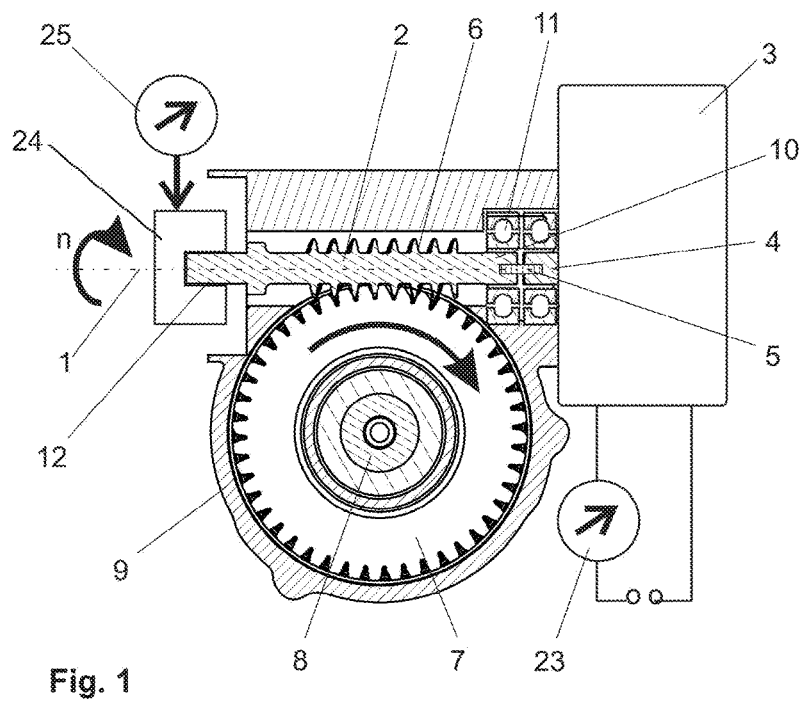
FIG. 1 is a longitudinal sectional view of an example pre-assembled servo steering system taken along a worm shaft during a running-in process.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

It is therefore one example object of the present disclosure to provide a method for running in a worm wheel gear of an electromechanical steering system, and an electromechanical steering system with a run-in worm wheel gear, wherein the run-in worm wheel gear has very good transmission of force and torque with little play and with low demands on the manufacturing precision of the toothed gear wheels.

According to one example method for running in a worm gear of an electromechanical steering system, the electromechanical steering system may have an electric motor, a worm shaft with an end close to the motor and an end remote from the motor, a worm wheel arranged on an output or input shaft, and a gear housing, wherein the motor is operatively connected to the worm shaft, and the worm shaft is in engagement with the worm wheel, wherein the example method may have the following steps:

a) Preparing a preassembled state of the electromechanical servo steering system, in which one end of the worm shaft, the end close to the motor or the end remote from the motor, is mounted rotatably in a bearing in the gear housing and the respective other end of the worm shaft is movable in the radial direction in order to form a free end;

b) Rotatably mounting the free end of the worm shaft in an adjustable pretensioning device which is configured to pretension the worm shaft in the direction of the worm wheel in the engagement;

c) Adjusting the pretensioning device by means of a control device for generating a defined pretensioning of the engagement;

d) Rotationally driving the worm shaft as a function of the control device at a defined rotational speed for a determined period of time.

By means of the previously described running-in process, the toothing of the worm wheel is matched to the toothing of the worm shaft, and the operating properties of the gear are optimized. The pretensioning device can be attached here to the end of the worm shaft close to the motor or to the end of the worm shaft remote from the motor. The running-in process can be carried out here both with a special driving motor and with the electric motor of the electromechanical steering system (=servo steering system). However, the special driving motor is preferably used since an electric contact connection of the electric motor of the servo steering system can be omitted, and a specially suitable motor can be used. Accordingly, the electric motor of the steering system is preferably installed only after the running-in process has taken place in this preferred variant.

Pretensioning forces within the range of 100 N to 1000 N can be used as values for the pretensioning.

As an alternative to the generation of a defined pretensioning mentioned in c), a predefined feed travel may also be set.

It is advantageous here if between method step b) and method step c) the following steps are provided:
  e) Measuring a high point of the worm wheel by means of the pretensioning device by rotating the worm shaft;
  f) Adjusting the toothing engagement of worm wheel and worm shaft to the high point of the worm wheel.

The defined pretensioning is therefore set when the high point of the worm wheel engages in the worm shaft.

Alternatively, the low point of the worm wheel can also be measured by means of the pretensioning device by rotating the worm shaft and correspondingly the toothing engagement of worm wheel and worm shaft can take place at the low point of the worm wheel.

A combination with the measurement of the high point and the low point is also possible. In this case, the adjustment of the toothing engagement can take place either at the high point or at the low point or at an intermediate value. The intermediate value has to be determined by tests.

In addition, after method step d) the following steps can be provided:
  g) Reducing the pretensioning by means of the control device to at maximum 20% of the defined value of the pretensioning, preferably to zero;
  h) Introducing a lubricant while the worm gear is running.

In the still heated state of the running worm gear, the lubricant is distributed particularly readily and also serves for cooling the gear at the end of the running-in process.

It is advantageous if, after the adjustment of the pretensioning, the free end of the worm shaft is held at a fixed position in order to determine a defined rotational axis, such that the worm wheel can be optimally adapted to the worm shaft.

A defined force/time curve and/or rotational speed/time curve is preferably passed through during method step c). For this purpose, the control device controls the pretensioning device and the motor.

In another embodiment, it is provided that, during method step d), in a first phase the worm shaft is driven at a rotational speed within the range of 500 rpm to 5000 rpm for a period of time within the range of 5 s to 60 s, and, in a further phase, during method steps g) and h), the worm shaft is driven at a rotational speed within the range of 100 rpm to 1000 rpm for a period of time within the range of 2 s to 30 s.

The worm wheel is preferably produced from plastic. The plastic here can be of such a strength that it does not have any particular damping properties, for example in order to compensate for possible tolerance fluctuations of the gear, since, by means of the running-in process, the plastic is heated or melted by the friction in the gear, as a result of which the toothing of the plastics worm wheel is matched to the toothing of the worm shaft.

After the running-in process, the run-in worm gear can be installed in electromechanical steering effort boosts, superposed steering systems or feedback actuators of steer-by-wire steering systems.

In one embodiment, the worm wheel is manufactured as an injection molded part. In the running-in process, during method step d), molecule change of the casting skin are advantageously then interrupted in the region of the supporting surface of the plastics worm wheel such that grease pockets are formed which can receive lubricants for lubricating the gear. In the running-in process of the gear, a surface modification of the plastics worm wheel therefore occurs; the very smooth casting skin to which lubricants customarily poorly adhere is processed by the run-in process in such a manner that, after the running-in process, the surface is provided with a surface structure holding lubricants. The grease pockets serve as a multiplicity of small lubricant depots which can hold the lubricant particularly permanently and which can be sufficiently filled even by a small quantity of lubricant.

Furthermore, an electromechanical steering system having a worm gear run in as per the previously mentioned methods is provided.

With reference now to the figures, FIG. 1 illustrates a longitudinal section of the gear of an example electromechanical servo steering system during the running-in process, in a preassembled state. The longitudinal section runs here along a rotational axis 1 of a worm shaft 2 which is driven by an electric motor 3. The electric motor 3 may have a motor shaft 4 that is coupled via a flexible coupling 5 to the worm shaft 2 for rotation therewith. The worm shaft 2 meshes with a worm wheel 7 via a worm toothing 6. The worm wheel 7 in turn may be is connected to the steering shaft 8 for rotation therewith, said steering shaft running between a steering wheel (not illustrated) and the actual motor vehicle steering gear (likewise not illustrated). The components mentioned are mounted in the example in a common gear housing 9.

The mounting of the worm shaft 2 in the housing 9 takes place at a motor-side end 10 of the worm shaft 2, in the example, in a conventional rolling bearing 11 which is designed in the example as a ball bearing. The ball bearing 11 is designed in such a manner that the worm shaft 2 can carry out slight axial movements and slight changes of the rotational axis 1 in relation to the housing 9.

Furthermore, the electric motor 3 has a torque sensor which determines the torque by measurement of the current or another power measurement. For this purpose, for example, a measuring device 23 is provided in the control current circuit of the electric motor 3. As a result, the running in of the worm gear can be monitored.

Alternatively, monitoring may also be omitted and simply a sequence of predefined rotational speeds of the electric motor 3 adjusted during the method. The rotational speed of the worm shaft 2 can therefore be precisely adjusted via a control unit.

At an end 12 of the worm shaft 2 remote from the motor, the worm shaft 2 is mounted rotatably in a pretensioning device 24. The pretensioning device 24 generates a pretensioning perpendicular to the rotational axis 1 of the worm shaft 2, in the direction of the worm wheel 7, as a function of the control unit. The size of the pretensioning can be measured with a measuring device 25. In addition, the rotational speed n of the worm shaft is measured.

For the running in of a relatively strong plastics toothing of the worm wheel 7 onto the toothing of the worm shaft 2, a defined pretensioning is set and the electric motor 3 is rotated at a defined rotational speed n0 for a defined period of time in load-free operation. The worm shaft 2 is preferably manufactured here from metal. Natural friction between the worm shaft 2 and the worm wheel 3 causes an increase in temperature which leads to heating and partial melting of the plastics toothing. The pairing of the plastics toothing of the worm wheel 7 to the toothing of the worm shaft 2 takes place, and the manufacturing tolerances of the two components are compensated for. Furthermore, the subsequent lubrication of the gear is improved by, during the running-in process, molecule chains of the plastics worm wheel 7 being interrupted in the region of the surface and therefore grease pockets being formed, in which the lubricant is subsequently stored.

The running-in process is already completed in the preassembled gear, and therefore the operating properties of the gear, such as acoustics, friction and play, do not substantially change during the operation.

In an exemplary embodiment, it is envisaged allowing a pretensioning force within the range of 100 N to 1000 N to act perpendicularly to the rotational axis of the worm shaft, in the direction of the worm wheel. First of all, for this purpose, the radius of the worm wheel is measured by means of the pretensioning device and the high point, i.e. that point on the wheel circumference which is at the greatest distance from the rotational axis, is determined. The pretensioning is then adjusted to said high point of the worm wheel 7. The pretensioning device holds the worm wheel in a positionally fixed manner in relation to the rotational axis of the worm wheel 7 when the gear is running.

In a first phase, the worm shaft 2 is subjected at the beginning to a pretensioning within the range of 100 N to 1000 N and is then driven by means of the electric motor 3 at a rotational speed within the range of 500 rpm to 5000 rpm for a duration within the range of 5 seconds to 60. This is followed by the cooling phase in which the pretensioning is reduced to values within the range of 20% of the previously set value. In this phase, the pretensioning is particularly preferably reduced to 0. In this cooling phase, the rotational speed of the run shaft is reduced to values of between 100 rpm to 1000 rpm. The duration of the cooling phase is 2 seconds to 30 seconds.

During the cooling phase, gear grease is injected which, because of the heat, is distributed rapidly and uniformly and additionally contributes to the cooling. The worm temperature is then reduced at a standstill to an extent such that the toothing of the worm wheel 2 does not press further into the plastics toothing of the worm wheel 7.

The worm shaft is not restricted in its rotational direction. It can be provided to move the worm shaft during the running-in process with a changing rotational direction since constantly changing rotational movements should be anticipated even during the operation of the gear in a servo steering system.

The embodiments are not restricted to the position of the pretensioning device. It is likewise conceivable to arrange the pretensioning device at that end of the worm shaft which is close to the motor.

The electric motor can be replaced by any drive having the necessary prerequisites. It is also conceivable for the electric motor used for the running-in process to be the already mounted servo motor of the servo steering system.

After the running-in process of the gear has taken place successfully and a defined force/time curve and/or rotational speed/time curve has been passed through, the installation takes place.

Figure 2:
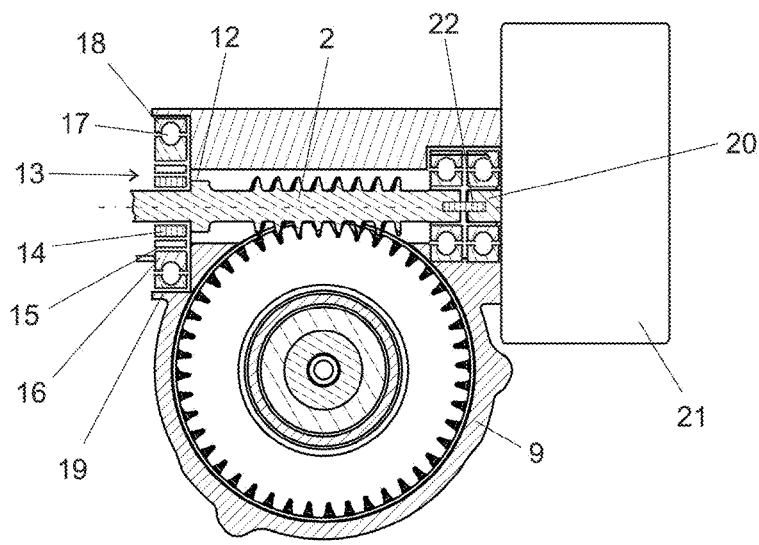
FIG. 2 is a longitudinal sectional view of an example servo steering system taken along a worm shaft that has been installed by way of the running-in process.

FIG. 2 illustrates the run-in gear in an operating state. The worm shaft 2 is mounted here at its end 12 remote from the motor in a rolling bearing 13. The rolling bearing 13 has an inner ring 14, rolling bodies 15 and an intermediate ring 16. The intermediate ring 16 is in turn itself provided on its outer side with a running groove for balls 17. The balls 17 run in an outer ring 18 which is finally fastened in a bearing seat 19 of the housing 9. At the motor-side end 10, the worm shaft 2 is coupled via a flexible coupling 22 to a motor shaft 20 of an electric motor 21 of the servo steering system for rotation therewith.

In the example, the electric motor 3 which is used for the running-in method, is different from the electric motor 21 which is used in the electromechanical servo steering system. However, it is also conceivable and possible to carry out the method with the electric motor which is used in the servo steering system.

Cushioning of the toothing engagement of the worm shaft and of the worm wheel, in order to achieve a play-free toothing engagement, can take place, for example, with an eccentric mounting on that side of the worm shaft which is remote from the motor, as illustrated in FIG. 2, or else with an eccentric mounting on that side of the worm shaft which is in the vicinity of the motor.

The run-in gear according to the invention is suitable for installing in electromechanical steering effort boosts, superposed steering systems or feedback actuators of steer-by-wire steering systems. By means of the running-in according to the invention of the gear before installation into the steering system, a worm wheel gear is provided which has a very good gear transmission with little play, and with low tolerance demands imposed on the toothed gear wheels.

What is claimed is:

1. A method for running in a worm gear of an electromechanical steering system comprising an electric motor, a worm shaft that is operatively connected to the electric motor and includes a first end proximate the electric motor and a second end distal the electric motor, a worm wheel disposed on an output shaft or an input shaft and engaged with the worm shaft, and a gear housing, the method comprising:
preparing a preassembled state of the electromechanical steering system wherein the first end of the worm shaft is rotatably mounted in a bearing in the gear housing and the second end of the worm shaft is movable in a radial direction as a free end;
rotatably mounting the second end of the worm shaft in an adjustable pretensioning device that is configured to pretension the worm shaft in a direction of the engaged worm wheel;
adjusting the adjustable pretensioning device by way of a control device so as to generate a defined amount of pretension between the worm wheel engaged with the worm shaft;
rotationally driving the worm shaft as a function of the control device at a defined rotational speed for a determined period of time; and
after rotatably mounting the second end of the worm shaft but before adjusting the adjustable pretensioning device:
measuring a high point of the worm wheel with the pretensioning device by rotating the worm shaft; and
adjusting a toothing engagement of the worm wheel and the worm shaft to the high point of the worm wheel.

2. The method of claim 1 further comprising holding the second end of the worm shaft in a fixed position after adjusting the adjustable pretensioning device to determine a defined rotational axis.

3. The method of claim 1 wherein the defined amount of pretension in the adjustment of the adjustable pretensioning device is based on at least one of a defined force-time curve or a defined rotational speed-time curve.

4. The method of claim 1 wherein the worm wheel is produced from plastic.

5. The method of claim 1 further comprising installing the worm gear in an electromechanical steering effort boost, a superposed steering system, or a feedback actuator of a steer-by-wire steering system after rotationally driving the worm shaft at the defined rotational speed for the determined period of time.

6. The method of claim 1 further comprising:
   manufacturing the worm wheel as an injection molded part; and
   interrupting molecule chains of a casting skin in a region of a supporting surface of the injection molded worm wheel such that grease pockets are formed that accommodate lubricants for lubricating the worm gear, wherein the interrupting is performed during the rotational driving of the worm shaft.

7. The method of claim 1 further comprising the following after rotationally driving the worm shaft:
   reducing the pretension between the worm wheel engaged with the worm shaft by way of the control device to at most 20% of the defined amount of the pretension; and
   introducing a lubricant while the worm gear is running.

8. The method of claim 7 wherein:
   rotationally driving the worm shaft at the defined rotational speed for the determined period of time comprises driving the worm shaft at 500 to 5,000 rpm for 5 to 60 seconds, and
   the worm shaft is driven at a rotational speed of 100 to 1,000 rpm for 2 to 30 seconds during the reduction of the pretension between the worm wheel engaged with the worm shaft and during the introduction of the lubricant.

* * * * *